United States Patent
Ledet

(10) Patent No.: US 10,425,422 B1
(45) Date of Patent: Sep. 24, 2019

(54) MESSAGE CONTENT MODIFICATION DEVICES AND METHODS

(71) Applicant: OPEN INVENTION NETWORK LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 282 days.

(21) Appl. No.: 15/615,958

(22) Filed: Jun. 7, 2017

Related U.S. Application Data

(60) Provisional application No. 62/347,131, filed on Jun. 8, 2016.

(51) Int. Cl.
| | |
|---|---|
| H04L 29/06 | (2006.01) |
| G06F 21/62 | (2013.01) |
| H04L 12/58 | (2006.01) |
| G06F 17/27 | (2006.01) |

(52) U.S. Cl.
CPC ........ H04L 63/104 (2013.01); G06F 17/2705 (2013.01); G06F 21/6218 (2013.01); H04L 51/20 (2013.01); H04L 51/24 (2013.01); H04L 63/083 (2013.01); H04L 63/0861 (2013.01)

(58) Field of Classification Search
CPC .............................. H04L 63/104; H04L 51/20
See application file for complete search history.

(56) References Cited

U.S. PATENT DOCUMENTS

| | | | |
|---|---|---|---|
| 5,960,080 | A | 9/1999 | Fahlman et al. |
| 7,987,511 | B2 | 7/2011 | Kitchener et al. |
| 8,195,939 | B2 | 6/2012 | Germersheim et al. |
| 8,510,398 | B2 | 8/2013 | Yasrebi et al. |
| 10,193,844 | B1* | 1/2019 | Conley ................... H04L 51/18 |
| 2002/0026487 | A1 | 2/2002 | Ogilvie et al. |
| 2002/0178365 | A1 | 11/2002 | Yamaguchi |
| 2004/0078596 | A1 | 4/2004 | Kent et al. |
| 2005/0278620 | A1 | 12/2005 | Baldwin et al. |
| 2006/0075228 | A1 | 4/2006 | Black et al. |
| 2008/0301433 | A1* | 12/2008 | Vito .................... H04L 63/0428 713/153 |
| 2010/0138658 | A1 | 6/2010 | Logue et al. |
| 2010/0275021 | A1 | 10/2010 | Kristiansen et al. |
| 2011/0099380 | A1* | 4/2011 | Vandewater .......... H04L 63/102 713/176 |
| 2011/0113109 | A1 | 5/2011 | LeVasseur et al. |
| 2012/0158837 | A1* | 6/2012 | Kaul ...................... H04L 51/24 709/204 |

(Continued)

Primary Examiner — Ali Shayanfar

(57) ABSTRACT

The example embodiments are directed to an application and a system capable of securely delivering message content to an unintended recipient to enhance the security of message delivery. In an example, the method includes at least one of: receiving an electronic message from a user device, the electronic message including secure content and one or more recipients, determining that a recipient of the electronic message is a member of a project group associated with an organization, and in response, identifying an unintended recipient who is associated with the organization but who is not a member of the project group, and transmitting a notification to a device of the recipient indicating that the secure content is accessible via a device of the unintended recipient instead of transmitting the secure content directly to the device of the recipient.

15 Claims, 14 Drawing Sheets

(56) References Cited

U.S. PATENT DOCUMENTS

| | | |
|---|---|---|
| 2013/0036478 A1 | 2/2013 | Davis et al. |
| 2013/0268357 A1 | 10/2013 | Heath |
| 2013/0333018 A1 | 12/2013 | Doukhvalov et al. |
| 2014/0201527 A1 | 7/2014 | Krivorot |
| 2014/0208445 A1 | 7/2014 | DeLuca et al. |
| 2014/0280261 A1 | 9/2014 | Butler et al. |
| 2014/0314232 A1 | 10/2014 | Fahrny |
| 2015/0082391 A1 | 3/2015 | Lerman et al. |
| 2015/0135337 A1* | 5/2015 | Fushman ............ G06F 16/9558 726/30 |
| 2015/0150091 A1 | 5/2015 | Bruce et al. |
| 2015/0205975 A1* | 7/2015 | Agrawal ................ G06F 21/51 713/189 |
| 2015/0381567 A1* | 12/2015 | Johnson ................ G06F 21/105 726/12 |
| 2016/0142501 A1 | 5/2016 | Herger et al. |
| 2016/0205105 A1* | 7/2016 | Nainwal ............... H04L 63/101 726/28 |
| 2016/0241530 A1* | 8/2016 | Andreev ................ H04L 51/12 |
| 2016/0285893 A1* | 9/2016 | Childress ............ H04L 63/0428 |

\* cited by examiner

FIG. 3A
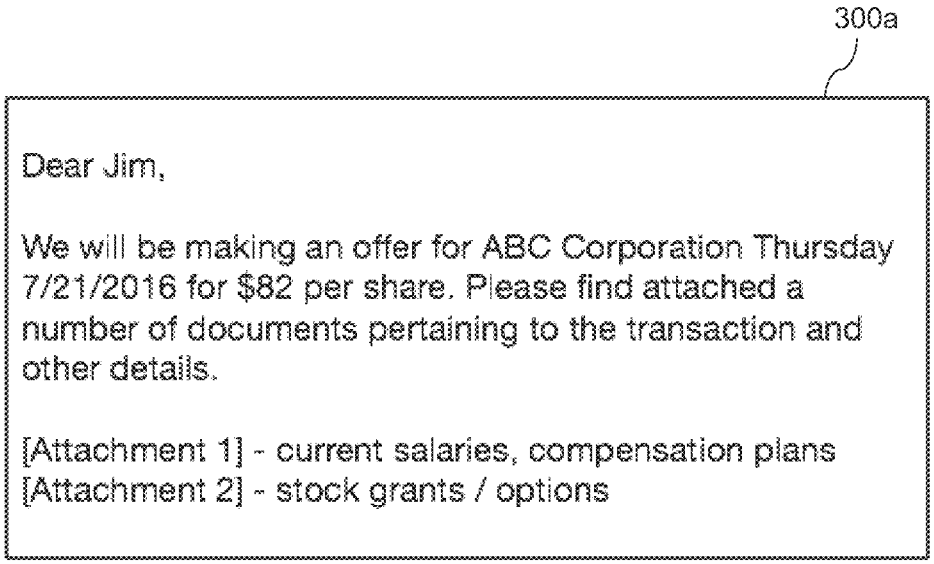
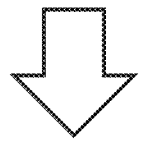
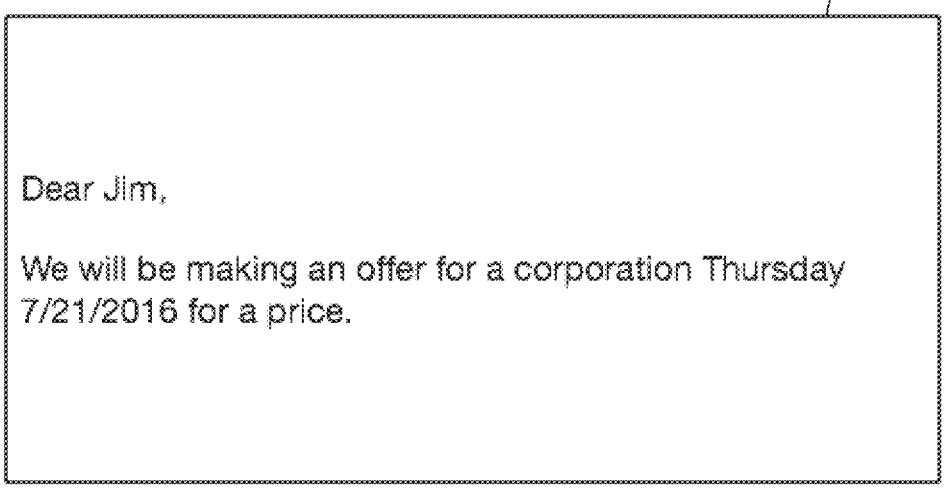

MESSAGE CONTENT MODIFICATION DEVICES AND METHODS

CROSS REFERENCE TO RELATED APPLICATION(S)

This application claims priority to U.S. Provisional Patent Application No. 62/347,131, filed on Jun. 8, 2016, in the United States Patent and Trademark Office, which is hereby incorporated by reference in its entirety.

BACKGROUND

As mobile devices and personal computers become more powerful, the amount and frequency of electronic messages (e.g., email, instant message, text message, etc.) continues to expand. At present, electronic messages may be sent from and delivered to a user just about anywhere because users typically carry a network accessible device (e.g., mobile phone, laptop, tablet, etc.) with them at all times and also have access to the Internet through home networks, work networks, cellular networks, hotspots, and the like. In addition, most modern smartphones come with built-in email clients, text, and instant messaging services making it possible for users to begin sending messages via multiple channels without having to search for, download or install software related thereto.

In a typical electronic messaging system, once an electronic message has been sent it is not possible for a sender to modify the text content, attachments, or recipients included within the message, because the message has left the control of the senders messaging service and is on the way to (or has already been delivered to and received by) the recipient's messaging service. Recently, some messaging systems have begun offering a special recall feature that allows messages to be recalled. However, the recall feature requires the sender to be quick on their feet and initiate the recall almost immediately from when the message is sent (e.g., within a few seconds). Furthermore, the recall feature merely removes the message but does not provide for modifying content included within the message. As a result, a user must generate a new message and forego the original message. Therefore, what is needed is a system and method capable of modifying content included within an outgoing electronic message.

SUMMARY

In one example embodiment, provided is a method for withholding content including receiving an electronic message from a user device, the electronic message including content and at least one message recipient, withholding a portion of the content of the electronic message for a message recipient based on a subject matter of the content portion and transmitting a remaining content portion of the electronic message to the message recipient, receiving information about a subsequent activity of the message recipient from a message recipient device, and transmitting withheld content to the message recipient based on the received information about the subsequent activity of the message recipient.

In another example embodiment, provided is a computing device including a network interface configured to receive an electronic message from a user device, the electronic message including content and at least one message recipient, and a processor configured to withhold a portion of the content of the electronic message for a message recipient based on a subject matter of the content portion, and control the network interface to transmit a remaining content portion of the electronic message to the message recipient, wherein the processor is further configured to receive information about a subsequent activity of the message recipient from a message recipient device, and control the network interface to transmit withheld content to the message recipient based on the received information about the subsequent activity of the message recipient.

In another example embodiment, provided is a method for delivering message content to an unintended recipient based on members of a project, the method including receiving an electronic message from a user device, the electronic message including secure content and one or more recipients, determining that a recipient of the electronic message is a member of a project group associated with an organization, and in response, identifying an unintended recipient who is associated with the organization but who is not a member of the project group, and transmitting a notification to a device of the recipient indicating that access to the secure content is accessible via a device of the unintended recipient instead of transmitting the secure content directly to the device of the recipient.

In another example embodiment, provided is a computing device including a network interface configured to receive an electronic message from a user device, the electronic message including secure content and one or more recipients, and a processor configured to determine that a recipient of the electronic message is a member of a project group associated with an organization, and in response, identify an unintended recipient who is associated with the organization but who is not a member of the project group, wherein the processor is further configured to control the network interface to transmit a notification to a device of the recipient indicating that access to the secure content is accessible via a device of the unintended recipient instead of transmitting the secure content directly to the device of the recipient.

BRIEF DESCRIPTION OF THE DRAWINGS

For a proper understanding of the example embodiments provided herein, reference should be made to the accompanying figures. It should be appreciated that the figures depict only some embodiments of the invention and are not limiting of the scope of the invention.

FIGS. 3A and 3B illustrate a process of splitting message content into portions and withholding some of the split content according to an embodiment.

DETAILED DESCRIPTION OF THE EMBODIMENTS

Figure 1:
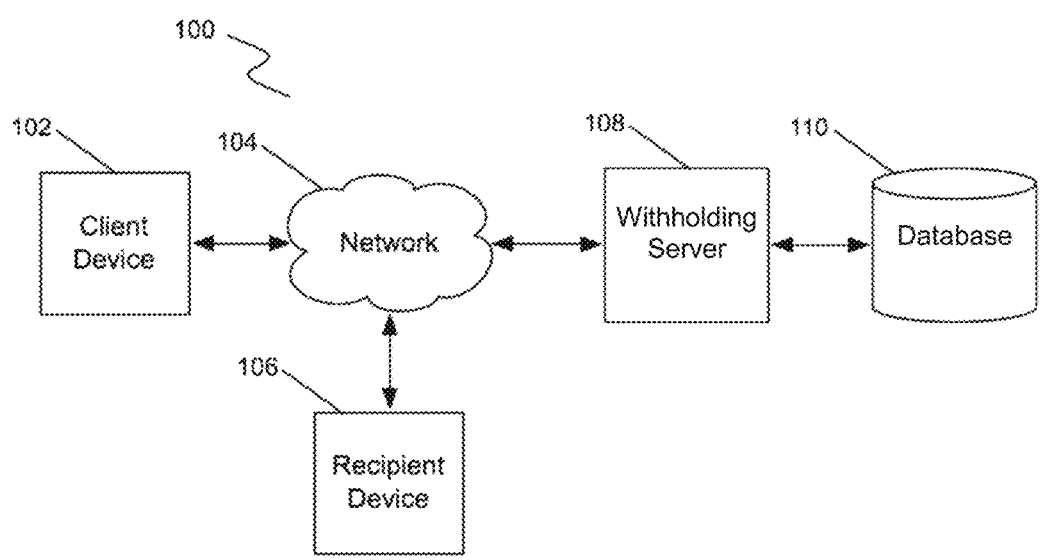
FIG. 1 is a diagram illustrating a system for withholding message data according to an embodiment.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification does not necessarily refer to the same group of embodiments, and the described features, structures, or characteristics may be combined in any suitable manner in one or more embodiments.

The example embodiments are directed to systems, devices, and methods for withholding electronic message content such as message content included within an email, an instant message, a text message, a Social Messaging Service (SMS) message, and the like, and delivering the withheld content in steps. In various aspects, message content may be removed from the message or otherwise withheld based on an identified subject matter of the content or a level of detail of the content. Furthermore, the withheld content may be delivered at a later time to the intended recipient based on a subsequent activity of the intended recipient.

The withheld content may include text content (e.g., words, sentences, paragraphs, etc.) from a body of the electronic message, text within a subject line of the message, an attachment to the message (or parts thereof), and the like. The content withholding may be performed by an application that is deployed and executing in a cloud computing environment, a data withholding server, a message server, a client device, a recipient device, a combination thereof, and the like. For example, the application may deliver an initial generic part of message content to the recipient while withholding more particular details. The application may receive information identifying interactions of the recipient with outside sources such as Internet sites, communications with other users, movement of the recipient device, and the like, and transmit previously withheld content to the recipient based on a subject matter (e.g., keywords) of the interactions of the recipient and/or the recipient device.

Additional embodiments are directed to a system and method for transmitting secure content intended for a member of a project (or group) to an unintended recipient who is not a member of the project or group. In this example, the application described herein may receive an outgoing message including secure content and a message recipient, and determine that the message recipient is a member of a project/group associated with an organization by accessing project information exposed by an application programming interface (API) of project management software of the organization. In response to determining that the intended recipient is a member of a particular group associated with the organization, the application may deliver the secure content to a device of an unintended recipient who is also associated with the organization but who is not a member of the group in order to enhance the security of the content. Furthermore, the application may notify the unintended recipient that their device is being used to store/retrieve secure information for another user. In this example, only the intended recipient may access the secure content via the device of the unintended recipient, for example, using secure information known only to the intended recipient or biometric information.

FIG. 1 illustrates a system 100 for withholding message data according to an embodiment. The system 100 includes a client device 102 (i.e., sender) that sends an electronic message intended for a recipient device 106 (i.e., recipient). For example, the client device 102 and the recipient device 106 may be a computer, a laptop, a tablet, a smart phone, an appliance, a wearable device, a gaming console, and the like. The system 100 also includes a withholding server 108 that may act as a router of electronic messages from the client device 102 to the recipient device 106 and which is configured to withhold message content of an electronic message after receiving the message from the client device 102 but before delivering the message to the recipient device 106. For example, the withholding server 108 may be an email server, a messaging server, a chat server, and/or the like, but the embodiments are not limited thereto. As another example, the withholding server 108 may be a server dedicated to performing the embodiments described herein. Each of the devices of the system 100 of FIG. 1 may be connected to each other via a network 104 such as a private network, intranet, etc., and/or a public network, Internet, and/or the like. Through the system 100, the client device 102 may send electronic messages to recipient device 106 via one or more intermediate devices such as withholding server 108.

According to various embodiments, the withholding may be performed by an application that is executing within system 100, for example, stored and executed on the withholding server 108, or a combination of the withholding server 108, the client device 102 and/or the recipient device 106. Here, the application, in the form of software for example, allows a user utilizing the client device 102 to interact with an electronic message client such as email, instant message, web chat, SMS text message, and the like. Here, the client device 102 may correspond to a user device such as a laptop, a tablet, a smart phone, a wearable device, an appliance, a television, a gaming system, a Blu-ray player, and/or the like. The software may be included within client device 102 by default or it may be downloaded from a remote source, for example the network 104.

The user of the application may interface with the client device 102 and connect through the network 104 to the withholding server 108. The withholding server 108 may be redundant, or be more than a single entity without deviating from the scope of the application. A database 110 that stores information for determining whether to withhold data for a particular recipient may be directly connected to the withholding server 108 or connected remotely through the network 104.

The application for withholding data may reside either completely or partially on the withholding server 108, but may also reside on a user's desktop computer, a personal digital assistant (PDA), tablet computer, or any other device containing a processor, memory, and functional software such as an operating system. In addition, the application may reside either completely or partially on any one of the other elements in the system depicted in FIG. 1; for example, the network 104. The application may be downloaded through a platform (such as an application store or market) residing on the device or accessed via the device, or may be accessed through the device's browser communicably coupled to the network 104. Further, the application may be pre-loaded on the device or automatically loaded based on the location of the device, attributes of the user and/or of the device, etc.

Figure 2:
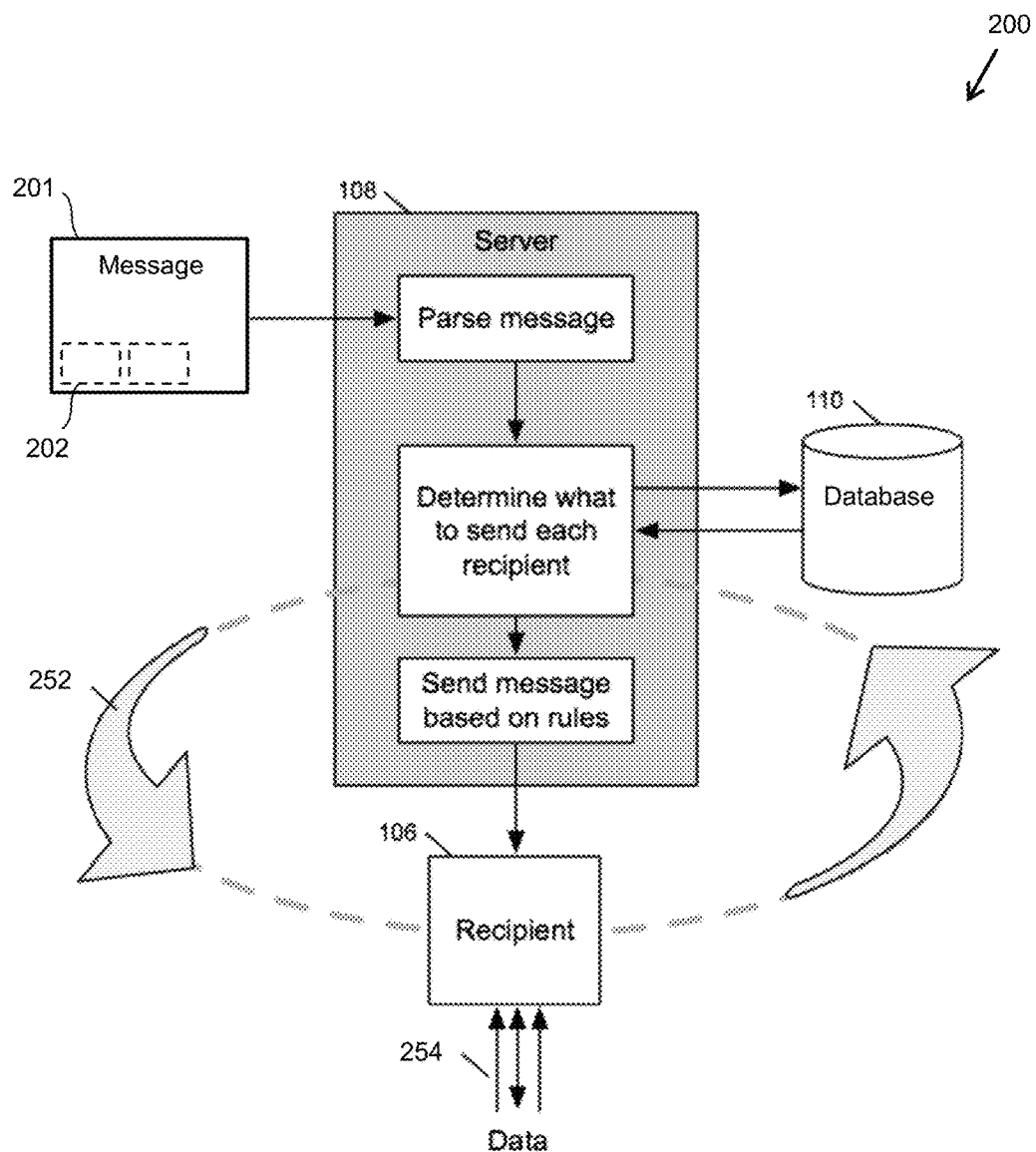
FIG. 2 is a diagram illustrating a feedback loop for delivering message content in steps based on recipient interactions according to an embodiment.

FIG. 2 illustrates a feedback loop 200 for delivering message content in steps based on recipient interactions according to an embodiment. In this example, an electronic message 200 is received by the withholding server 108 from a sending device (e.g., client device 102 in FIG. 1), and the content therein is partially withheld while the remaining content is transmitted to the recipient device 106. Furthermore, the partially withheld content is subsequently delivered by the withholding server 108 in steps based on interactions of the recipient fed back to the withholding server 108 from the recipient device 106. For example, the withholding server may withhold textual content such as one or more paragraphs, sentences, words, phrases, and the like, included within a body of the electronic message 200 or replace the textual content with more generic content. As another example, the withholding server 108 may withhold one or more attachments 201 from the electronic message 200. The content that is withheld may be based on a subject matter of the content such as a topic, an amount/level of detail, a security of the content, and the like, that is determined by the withholding server 108.

In the example of FIG. 2, data or content included in the originating message 200 may be delivered to recipients 106 in steps, or incrementally instead of providing all of the data at one time. For example, the content of the electronic message 200 may be parsed by the withholding server 108 and some parsed content of the originating message 200 may be withheld and some parsed content may be initially delivered to the recipient 106. Furthermore, in subsequent communications, portions of the withheld content of the original message 201 may be delivered to the recipient 106 based on interactions of the recipient 106 with data and/or other people. Furthermore, a state of the recipient 106 may be altered allowing the recipient 106 to then interact with additional data previously withheld from the recipient 106. In this embodiment, events occurring with the recipient and/or data interactions within the recipient may be provided to the withholding server 108 causing the withholding server 108 to send additional, previously withheld data.

According to various embodiments, a circular flow 250 may be established between recipients 106 (or potential recipients) and the withholding server 108 such that the withholding server 108 may be kept abreast of additional interactions of the recipients, which would cause or otherwise trigger the withholding server 108 to send previously withheld data in addition to already sent data within a message. The circular flow 250 may correspond to a feedback loop in which information about the recipient and the recipient device may be fed back to the withholding server 108. FIG. 2 provides an example of the withholding server 108 processing of an incoming message in which originally withheld message content is sent to the recipient 106 based on additional data 254 that the recipient 106 has received and/or interacted with.

In this example, electronic message 201 is sent from a sending device and is intended for the recipient 106. The electronic message 201 may include body content as well as attachments which include content therein. In response to receiving the electronic message 201, the withholding server 108 may identify content within the message 201 that should be withheld based on predetermined criteria (e.g., subject matter, level of detail, etc.) stored in database 110. The withholding server 108 may withhold some content and send the remaining content to the recipient 106, which may contain a portion of the data in the original message. The withheld content may be stored by the withholding server 108 in association with the recipient 106.

The recipient 106 may subsequently interact with additional, external data 254, which may be fed back 252 to the withholding server 108. In response, the withholding server 108 may then ascertain that additional data of the original message 201 that was previously withheld may be delivered to the recipient. This process may continue until all of the data in the original message 201 is delivered to the recipient, until a predetermined period of time has elapsed, a condition is triggered, and the like. As the interaction of the recipient 106 occur, the withholding server 108 may be notified of content included in the interactions and additional, withheld data may be sent based thereon. Here, the message flow depicts the communication between a device of the recipient 106 and the withholding server 108 in which withheld data may be delivered to the recipient.

Figure 3B:
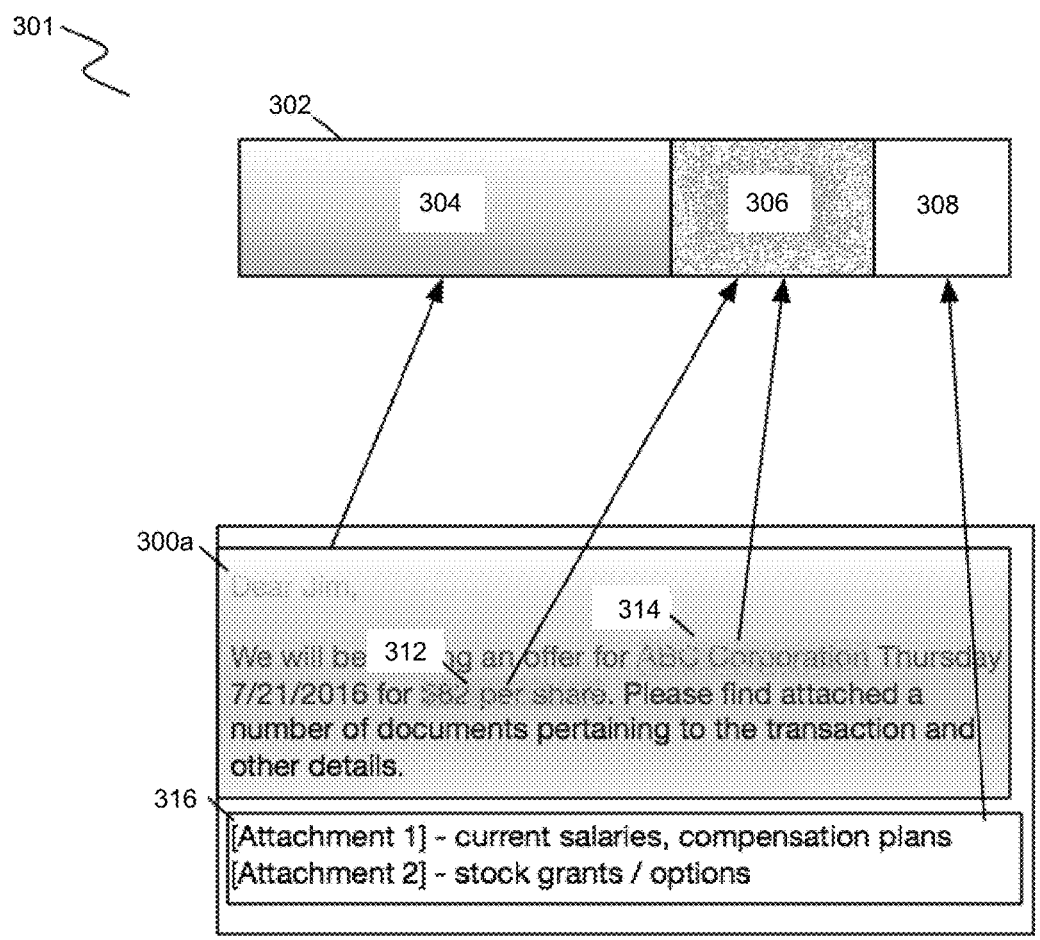

FIGS. 3A and 3B illustrate a process of splitting message content into portions and withholding some of the split content according to an embodiment. In this example, message content 300*a* send by a sender is parsed by the withholding server 108 to generate a remaining content portion 300*b*. In this example, included in the original message 300*a* are two attachments which are text files containing employee salaries, compensation plans, stock grants, and options disclosures. The withholding server 108 may parse the message content 300*a* and split the message according to the parsing of the data as shown in process 301 of FIG. 3B. Each split section may have a subject matter thereof which is identified and a determination may be made whether to withold the split section based on the subject matter thereof. In some embodiments, the withholding may also include replacing the withheld content with less detailed content. In the example of FIGS. 3A-3B, the main subject of the message is parsed out "ABC Corporation" and the message is modified to contain a more generic term "A Company" in place of the name of the organization. This splitting and parsing may take place wholly or partially in the withholding server 108, a database such as database 110, a client device recipient device 106, or any other component containing a processor and memory.

In addition, in this example, detailed secure information such as a per share price is also withheld and replaced with "A Price" thereby withholding the purchase price of the transaction from recipients. Furthermore, it is also determined by the withholding server 108 that the attachments are details of the message that should not be relayed to anyone, but only those that are authorized to receive that information. For example, by analyzing attachments, it is possible to extract text from an attached file, for example a Portable Document File (PDF) document and scan the text for keywords, phrases, subject matter, names, images, files, and the like. For example, utilizing a tool such as a Docotic .NET library for PDF document processing documents can be analyzed. The following example code illustrates how to extract text from a page or from an entire PDF document.
using System.Diagnostics;
using System.IO;

```
namespace BitMiracle.Docotic.Pdf.Samples
{
  public static class ExtractText
  {
    public static void Main( )
    {
      using (PdfDocument pdf = new PdfDocument("Sample data/
      jfif3.pdf"))
      {
        // Extract plain text from document
        string documentTextFile = "Document text.txt";
        using (StreamWriter writer = new StreamWriter
        (documentTextFile))
          writer.Write(pdf.GetText( ));
      Process.Start(documentTextFile);
        // Extract text with formatting from document
        string documentTextFormattedFile = "Document text with
        formatting.txt";
        using (StreamWriter writer = new StreamWriter
        (documentTextFormattedFile))
          writer.Write(pdf.GetTextWithFormatting( ));
        Process.Start(documentTextFormattedFile);
        // Extract plain text from first page
        string firstPageTextFile = "First page text.txt";
        using (StreamWriter writer = new StreamWriter
        (firstPageTextFile))
          writer.Write(pdf.Pages[0].GetText( ));
        Process.Start(firstPageTextFile);
      }
    }
  }
}
```

The above code utilizes a method of GetText( ) on the PDFDocument object and the GetText( ) from the PDFPage object to extract text in plain text format. Additionally, the GetTextData( ) method on the PdfCanvas object extracts text data with coordinates. The method GetTextWith Formatting( ) on the PdfDocumnt and PdfPage objects extract the text with formatting, meaning that the text will retain all relative text positions making the text more readable. Using the above or similar code, it is possible to extract the text from attachments, then examine the text in similar fashion as the other text and/or data in the message.

FIG. 3B shows a representation of content 1000 from data message 300a in FIG. 3A in which a section of text content has been split into different portions. Here, the content 1000 is represented as a split FIG. 1002 that includes three divisions of the content including most general aspects of the content 1004, content that requires more security 1006, and finally content that requires the most security 1008. In this example, the message is initially delivered to the recipient such that it only includes the most general content (1004) with the remaining content being withheld resulting in the resulting in the message 300b shown in FIG. 3A. Furthermore, as interactions of the recipient are fed back to the withholding server 108, portions of the withheld content may be delivered.

The feeding back may be accomplished via an application executing on the recipient device. For example, when the initial content of a message is delivered to the recipient, the message may also include an indicator indicating that other content of the message has been withheld and not delivered. The application executing on the recipient's device 106 may update the withholding server 108 with any interactions of the recipient that possibly affect the delivery of additional data that was withheld. For example, updates may be from the recipient 106 to the withholding server 108 to inform it of current interactions of the recipient. The updates may be sent in the form of a message that is sent from the recipient device 106 to the withholding server 108, via network 104 such that the withholding server 108 is aware of the current interactions of the recipient 106.

The interactions performed by the recipient 106 (e.g., a user via the recipient device) may include visiting web pages and web content such as text, images, video, audio, and the like. As another example, the interactions may include communication sessions with other users such as voice, email, text, chat, instant messaging, SMS messaging, and the like. For example, in FIGS. 3A and 3B, a user may read information via the recipient device associated with projected earnings, enter search questions into a search website regarding potential countries to incorporate or register in, tax structures, etc. These data interactions may be fed back from the recipient's device to the withholding server. In response to any of these interactions being encountered, the next level of data (in this example the name of the company and the amount of the offering) may be shared by the withholding server 108 with the recipient 106.

Figure 4:
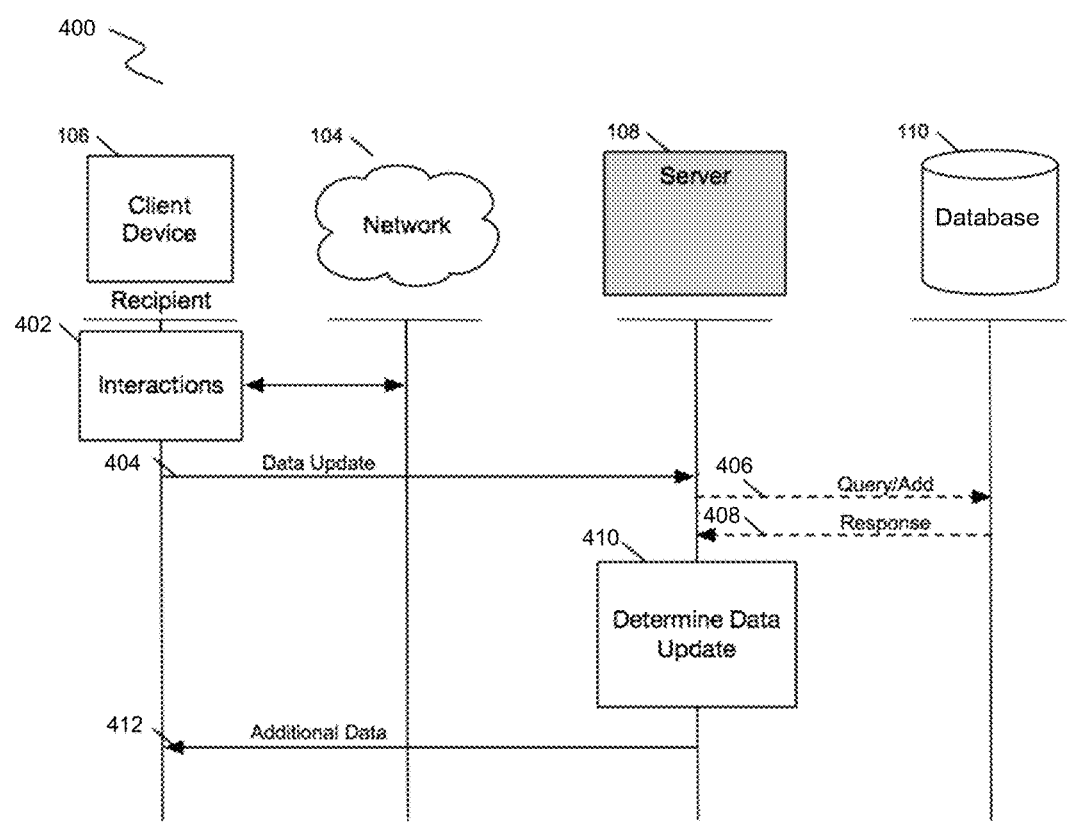
FIG. 4 is a sequence diagram illustrating a process of delivering withheld message content in steps according to an embodiment.

FIG. 4 illustrates a process of delivering withheld message content in steps according to an embodiment. FIG. 4 depicts an example of a message flow 400 in which the withholding server 108 is updated with additional information from the recipient device 106. The interaction between the recipient device 106 and outside parties (via the network 104) occurs in this example. These interactions (or content thereof) may be examined via interfaces such as APIs of electronic messaging applications, services, clients, etc., such as email, chatting, voice mail and the like.

According to various embodiments, the interactions of the recipient 106 may be searched and compared with keyword/phrases that are determined by the withholding server 108 based on previous keywords stored in the database 110, or the like. For example, the original message received from the sender may be parsed and split into portions, and each portion may be searched for keywords/phrases.

Referring to the example of FIG. 4, subsequent interactions 402 of the recipient 106 may be sent to the withholding server 108 via a message such as a "Data Update" message 404 wherein the message contains the current interactions and keyword/phrases that the recipient has interacted with, for example. In response, the withholding server 108 may interact with the database 110 to gain further information. For example, queries and updates may be sent from the withholding server in 406 and responses may be received from the database 408. In this case, the withholding server 108 may determine if any withheld message content may be sent to the recipient in 412 by comparing the withheld data with the current interaction data received by the message such as the data update message 410. For example, the withholding server 108 may determine if any of the interaction data in the data update message is similar in subject matter to the withheld data. For example, similar subject matter may include an interaction that takes place between the recipient and an outside party in which speech or text discusses the same or similar data in the withheld message content.

In an alternate embodiment, interaction data may not be received from a recipient's communications or data interactions but rather may be automatically provided to the withholding server 108 from the recipient device. For example, a particular action performed by the recipient or detected from the recipient device may include a location (e.g., GPS coordinates) of a user device from a mobile device of the recipient, an action performed by or on a user device, an action occurring on or by one or more components within the network, and the like.

Figure 5:
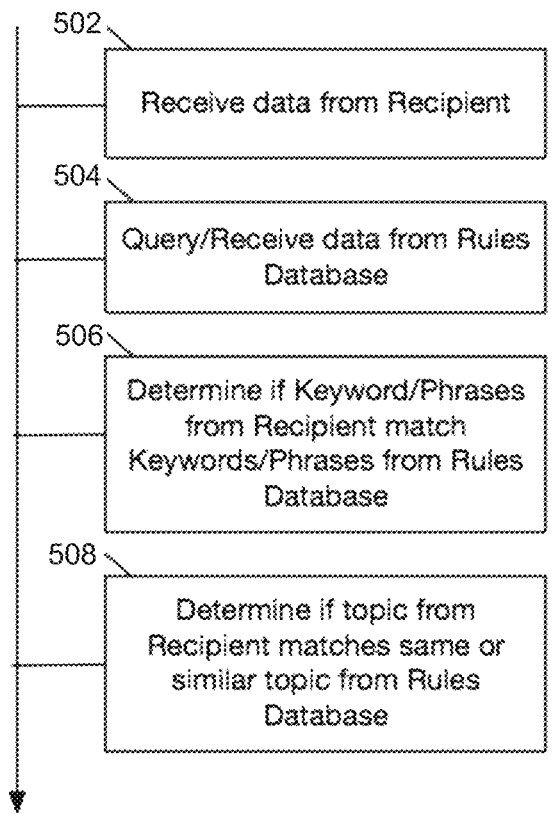
FIG. 5 is a diagram illustrating a method of determining to deliver withheld message content based on keyword matching according to an embodiment.

FIG. 5 illustrates a method 500 of determining to deliver withheld message content based on keyword matching according to an embodiment. In some embodiments, the recipient may indicate the ability to receive additional withheld data to the withholding server by providing a message such as additional data message 502 which may be sent from the recipient's device to a withholding server to update the server with recipient activity and possible indicate that previously withheld data may be transmitted. Here, the recipient may receive a portion of original message content while the rest of the message content is withheld by the withholding server. Here, the recipient may transmit the additional data message 502 to the withholding server to indicate that the recipient may receive any withheld data if there is data that has been withheld.

The withholding server may analyze the data update received from the recipient and transmit a query message to the database in 504 and receive a response to the query from the database in 504. In an alternate embodiment, data is not received from a recipient but rather automatically provided to one or more system components, such as to the database, the withholding server, or another component including a processor and memory, when a particular action occurs. For example, a particular action may include a location of a user device, an action performed by or on a user device, an action occurring on or by one or more components within the network, etc.

The keyword/phrases of the interaction data received from the recipient may be compared with message content originally intended for the recipient that has been withheld in the server to determine if there is a match in 506. For example, one or more topics or subject matters of the interaction data from the recipient may be compared with one or more topics or subject matters of the withheld message content to determine if there is a match between the topics in 508. As a non-limiting example, the withholding server may use a Thompson Reuters Open Calais Application Programming Interface (API) which can determine statistics from a given input of data. One of the determined outcomes is the topic of the data as well as the keywords and phrases in the data, in order to determine a topic or a subject matter of interaction data and withheld message content. If a match is identified, any withheld content having a matching topic to the interaction data may be transmitted to the recipient by the withholding server.

Figure 6:
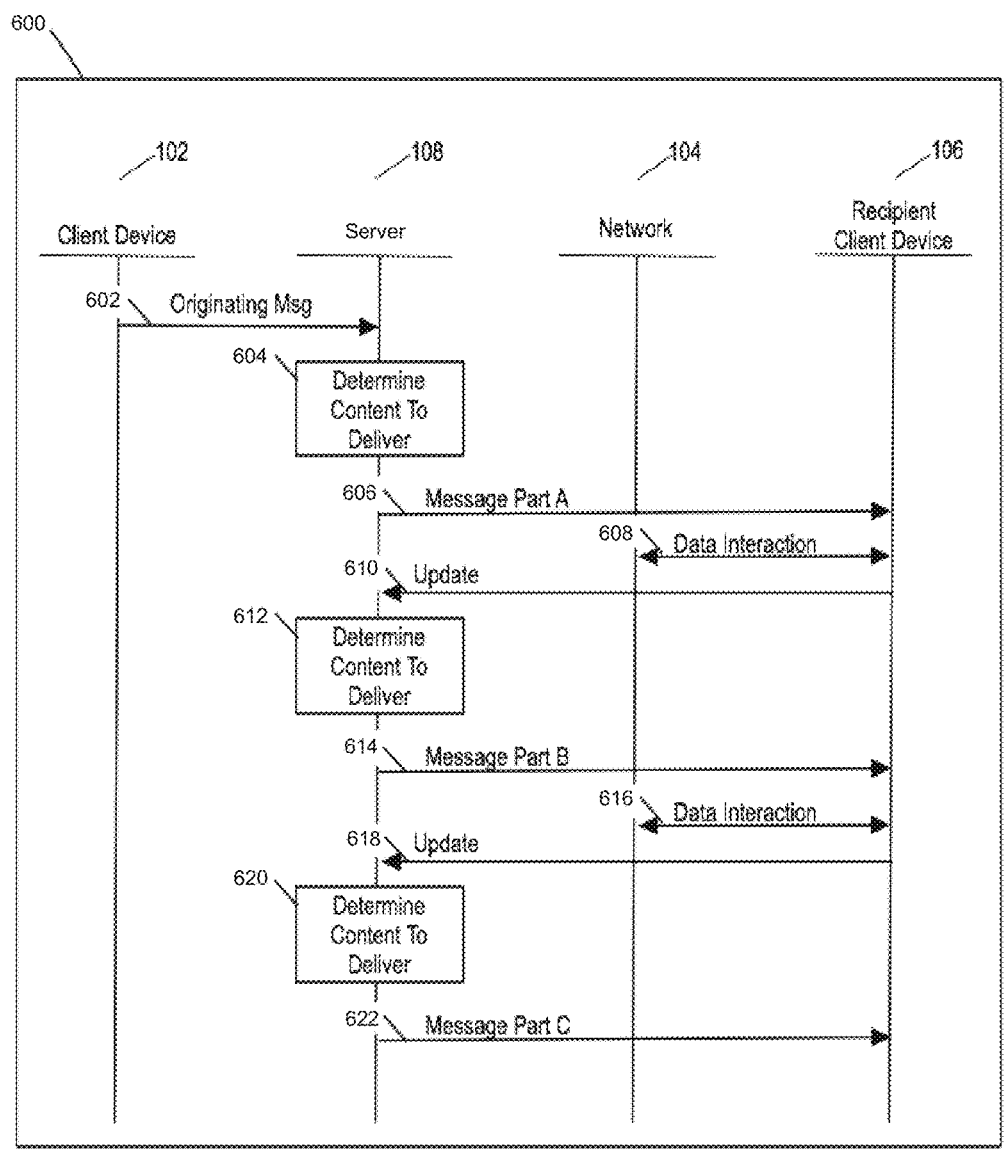
FIG. 6 is a sequence diagram illustrating a process of determining to deliver withheld message content according to an embodiment.

FIG. 6 is a sequence diagram that illustrates a process 600 of determining to deliver withheld message content according to an embodiment. The example illustrates processing of an incoming message where additional data is sent to the recipient 106 based on additional data that the recipient 106 has received and/or interacted with. The sequence of messaging as depicted and described herein may occur in any number of ways and can be received and/or sent by a different component before or after another message is received or sent by another component. For example, in FIG. 6, the client device of the sender 102 may access the withholding server 108 via the network 104.

An originating message is generated from the sender 102 wherein the originating message 602 is sent to the withholding server 108. In response, the withholding server 108 determines that there is some content in the originating message that is to be immediately delivered to the intended recipient in 604 and that there is data/content in the originating message that is to be withheld and stored by the withholding server 108 locally or in a remote component coupled to the server 108. Here, the withholding server 108 may also interact with a local or remote database, such as the database 110 (not depicted) to assist in determining the immediate data to send to the intended recipient as well as the data to withhold. In this example, it is determined that message part A 606 is to be sent to the recipient 106 while message part B 614 and message part C 622 are withheld.

Subsequent to receiving the message part A 606, the message recipient has interaction 608 with data through the network 104. This interaction may be with other elements in the system remotely as the messaging between these other elements and the recipient occurs through the network 104. For example, the network 104 may be the Internet, a cellular network switch, a traditional landline connection, or any other device wherein the recipient may interwork with data and/or other people. The recipient 106 updates the withholding server 108 with the updated status of the recipient via an update message 610. This may occur through the software application described herein executing on the recipient's device 106, which is monitoring the data interaction of the recipient. The update message may be routed through the network 104, optionally.

The withholding server 108 examines the content of the update message 870 that contains information about the data interaction of the recipient 106 that is detected by and received from the application executing on the recipient device 106. In response, the withholding server 108 determines if the current data interaction alters the flow of data in the original message in 602, including the withheld message content included in the originating message 602. In response to detecting that additional data is to be sent, the withholding server 108 sends a portion of the originally, withheld data in the original message as the current data interaction of the recipient because the data interaction of the recipient 106 altered the state of the recipient allowing the recipient to obtain additional data. For example, message part B 614 is sent to the recipient 106.

The recipient 106 has another interaction 616 with external data (e.g., websites, databases, outside users, etc.) through the network 104. In response, the recipient 106 updates the withholding server 108 with the updated status of the recipient via an update message 618. This may occur through the current application executing on the recipient's device which is monitoring the data interaction of the application. In response, the withholding server 108 examines the content of the update message 618 that contains the data interaction of the recipient as received from an application executing on the Client Device 106, for example the current application executing on the Client Device and determines 620 if the current data interaction alters the flow of data in the original message. In response, the withholding server 108 sends another portion of the originally, stored data in the original message as the current data interaction of the recipient and the data interaction altered the state of the recipient allowing the recipient to obtain additional data. For example, message part C 622 is sent to the recipient 106.

Figure 7:
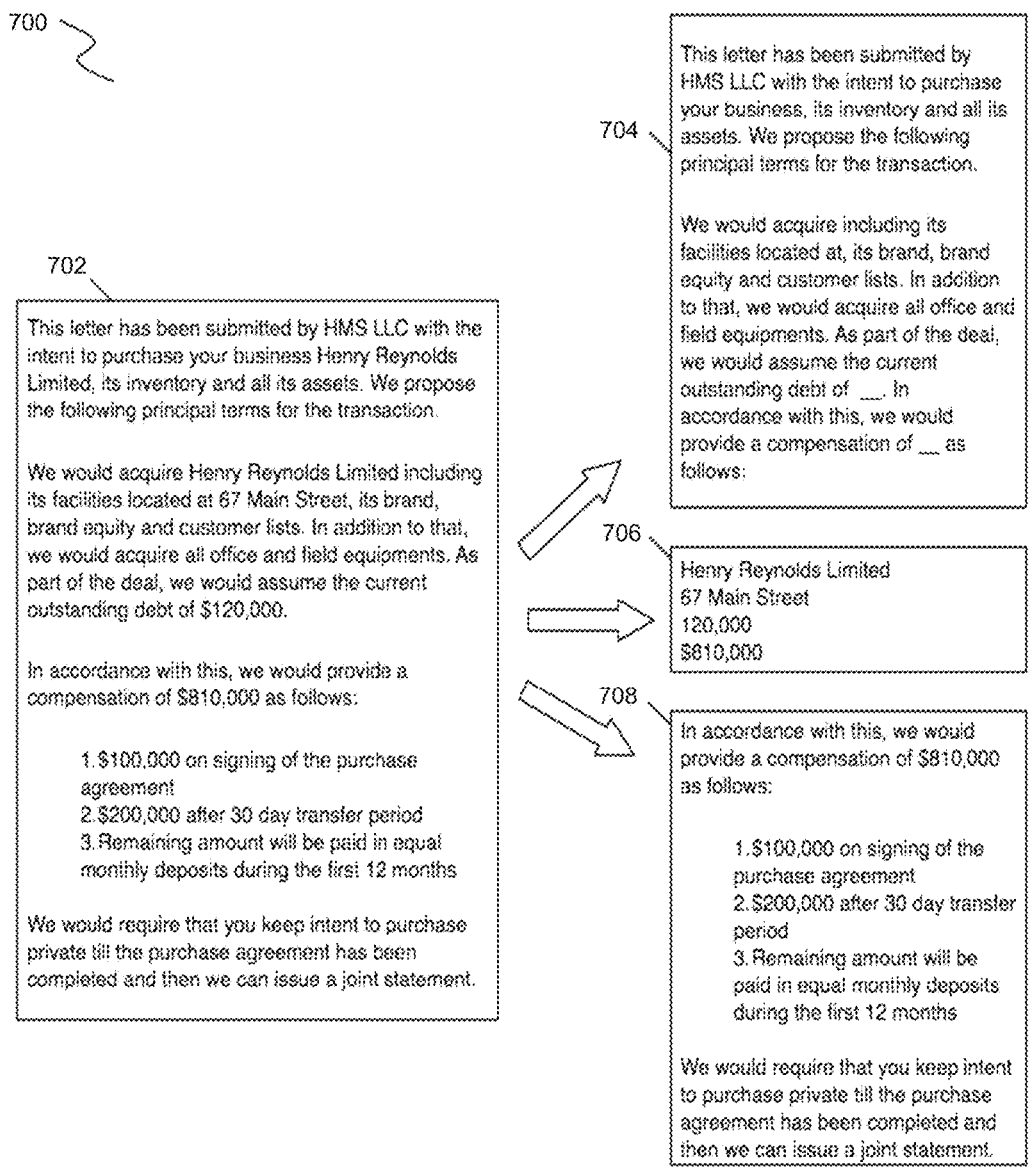
FIG. 7 is a diagram illustrating a process of withholding message content according to another embodiment.

For example, an original message may be received at the withholding server that includes financial information such as banking information, stock quotes, purchase information, and the like. The original message may contain details, a subject, and possibly one or more attachments which each include textual content therein. The textual content of the message may be parsed and data therein may be divided according to the details (e.g., subject matter) pertaining to different portions of the message. FIG. 7 illustrates a process 700 in which a message has been split into multiple, separate portions, which may be delivered at different steps to one or more recipients.

For example, original message 702 may be parsed once received by the withholding server 108 such that textual content of the message is split into multiple portions and optionally may be stored by the withholding server 108 and/or a remotely coupled element in the system. In this example, a first portion of the message 704 may be delivered to the recipient wherein the portion delivered contains the overall topic of the message without describing in detail the particulars of the entity being sought for purchase and the details surrounding the purchase. The removed portion of the message may be blacked out, left blank or empty, or replaced with other words and/or character of text. This type of message modification allows the recipient to understand that they are not receiving the entire message, obtain an understanding of the content that was withheld, and obtain an understanding of the flow of the original message without being provided the particular details of the proposed purchase described in the message.

In this example, the recipient may interact with additional data such as via a web search, via a download, via a communication session with another user, and the like. The interaction data may be provided to the withholding server from the recipient device via a message such as an update message. In the example of FIG. 7, it is assumed that the recipient is receiving further financial information such as projected earnings, questions regarding potential countries to incorporate or register in, tax structures, etc. In response, the withholding server may transmit a second portion 706 of the original message that contains further details of the original message, including the entity that is sought for purchase, the address of the entity, as well as the purchase price. This data may be send to the recipient or the first message may be resent with these additional elements included in the message.

Further data may also be received by the recipient device which may be sent to the withholding server. For example, another update message may be sent from the recipient device that contains the additional data interaction. For example, the recipient may be receiving questions regarding retention activities, cost cutting, etc. In response, the withholding server may transmit a third portion 708 of the message that includes further details of the message and completes the entire, original message. Accordingly, as the server, database, application, etc., is made aware of the recipient's current interaction as pertaining to the topic of the original message, more and continued data in the original outgoing message is made available to the recipient. In another embodiment, the withholding server may parse the questions, request/receive the interaction data, and compares the data to the data that the recipient or recipients currently have access to.

Figure 8:
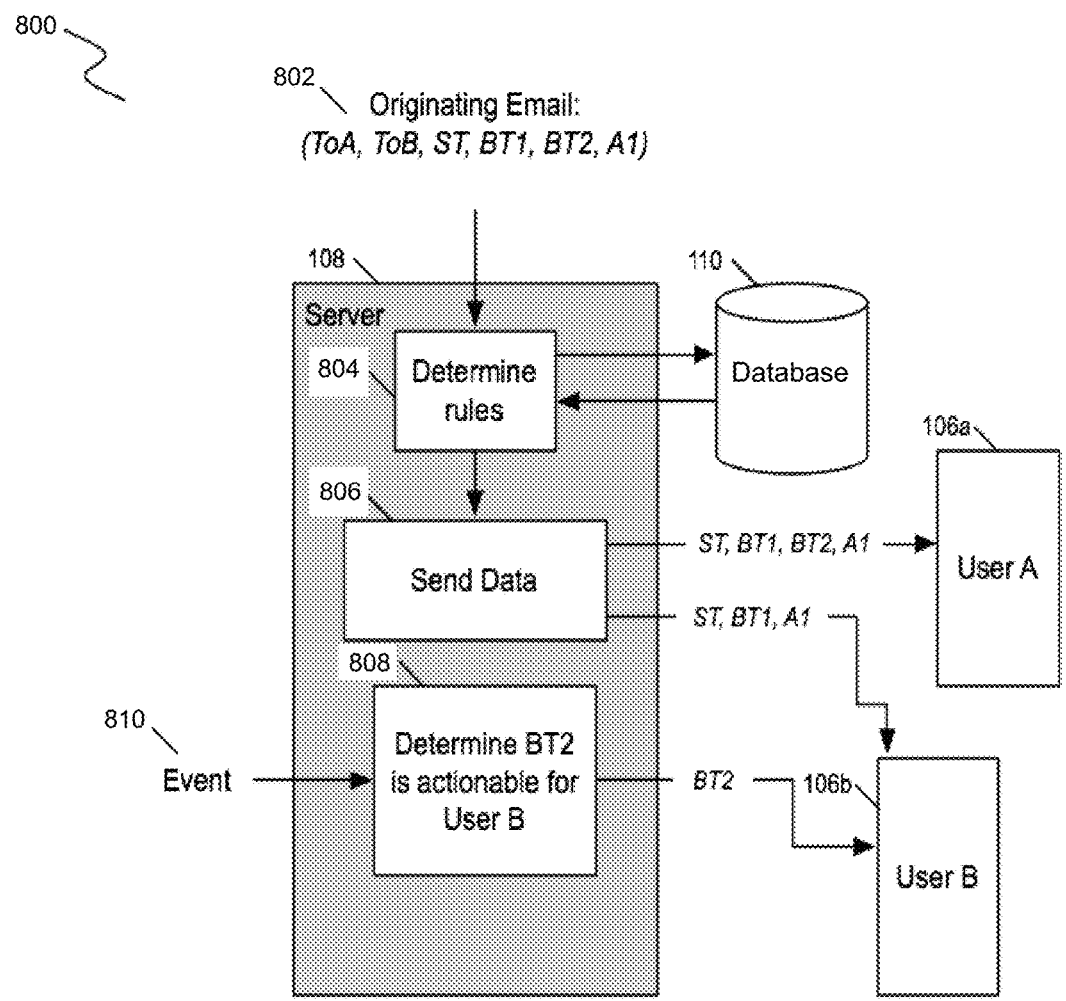
FIG. 8 is a diagram illustrating a process of withholding message content according to an embodiment.

FIG. 8 illustrates a process 800 of withholding message content according to an embodiment. In this example, the withholding server 108 parses email content, splits the email content into portions, identifies a subject matter of each portion, withholds some portions and transmits some portions. In this example, an originating message 802 is sent from a sender device and is received by the withholding server 108. In this example, the originating message 802 includes six content portions including two recipients, a subject line, two paragraphs of text within a body of the email, and one attachment. In this example, the withholding server 108 communicates with the database 110 to determine in 804 that the elements (ST, BT1, BT2, A1) should be sent to User A's client device 106a in 806 and that the elements (ST, BT1, and A1) should be sent to User B's client device 106b while withholding the element BT2 for User B in 808.

In this example, an event occurs in 810 such as User B interacting with external entities, such as remote servers or individuals, which triggers the withholding server 108 to transmit a withheld portion of the originating message 802 to User B because User B is at a different level of ability to receive additional data. The interaction with the remote entities is analyzed via the withholding server 108. For example, the withholding server may parse the data of the interaction (for example messaging, recorded voice calls, etc.) and identify a subject matter of the interaction. This interaction allows the Rules Server to transmit the previously withheld BT2 data from the original message 802 to User B's device 106b.

In alternative embodiments herein, the application may receive data (e.g., a message) from a sender that is intended for a recipient and may instead cause the data to be accessible to the recipient via a device of an unintended recipient. In these examples, the recipient and the unintended recipient may not know each other but both users may be associated with a same entity, organization, company, group, etc. Therefore, rather than transmit secure data directly to the recipient, the application may identify an unintended recipient and make the data accessible via the device of the unintended recipient in order to more securely protect the data from unauthorized access, man-in-the-middle attacks, etc.

For example, data such as an electronic message, document, file, and/or the like, may be sent to an unintended recipient with whom the data is not intentionally meant for. By doing so, an additional level of security is provided within an intuitive implementation for sending data more securely. According to various embodiments, in a software environment, development projects typically include a plurality of users within a project. Uses can include members of the project such as managers, staff, as well as other users. Also, there may be users associated with a same organization that are not part of the project (e.g., not members of the project).

For data such as electronic messages, documents, files, and the like, sent to users within a project, there may be situations where sensitive data is sent from an outside source (or from inside the project) with respect to users of the project associated with an organization. According to various aspects, a deeper level of security may be provided for data that is being sent across the network (whether the network in internal as in an intranet, or outside such as the Internet). The current embodiment seeks to overcome the issue of sending sensitive data across a network by automatically sending sensitive data to a device of an unintended user outside of the project, and enabling the intended recipient access to the same device even though they may not even know the user outside of the project. Accordingly, both the owner of the device and the intended recipient who is not a previous user of the device may access data from the device, yet only the intended recipient who is not the device owner may have access to the secure data on the said device. For example, pre-stored data stored at a central location and accessible by an application executing on the device of the unintended recipient may be used to authenticate the intended recipient via the unintended recipient's device.

For example, a data delivery server which may also be a withholding server (discussed with respect to FIG. 1) may obtain access to users of the organization, as well as specific projects inside the organization by extracting project information from software such as project management software or the like. For example, the server may communicate with an organization's project planning software via an access Application Programming Interface (API), or the like. Having access to the organization's current projects, the data delivery server may obtain the users who are currently within each project of an organization as well as users outside of each project. The data delivery server may send notifications to user devices of users that are inside of a sensitive project, as well as to users that are outside of the sensitive project.

For example, the users outside of the project that are notified may be users who are located in the same or similar geographic location as the users inside the sensitive project, in one embodiment. The notification may inform the users outside the project that their device is being utilized to store sensitive data, and that access is requested for users inside the project to obtain access to the sensitive data. Data may be sent to a device of a user outside of the project via the data delivery server. The data may be sent to the application described herein that is executing on the device of the users outside of the project and stored either in the user's device, or remotely at a server, database, etc. The application may access the stored data upon request from the current application. Also, the owner of said device does not have access to the data. Here, navigation via the application avoids the access to the stored data by allowing only authenticated users to access the secure data. For example, an authenticated user may be required to first sign into the current application and once authenticated, allows access to the sensitive data for those users inside the project.

The application described herein provides access to sensitive data stored on a device and removes access to the same sensitive data for other users of the device. In one embodiment, the use of fingerprint technology, retinal scan, or other biometrics, may be used to authenticate the user of a device. In mobile device technology, a fingerprint reader may be utilized on devices allowing the user to record the user's fingerprint to access either the device, or specific functionality of the device.

Using this technology, the application allows multiple users to record a fingerprint for a device, and assigns the fingerprint to specific data on the device. For example, the application may interwork with the device of a user who is outside of the secure group (henceforth called user A) to receive a fingerprint of the user to access the device. As such, the user of the device may pre-store a fingerprint to unlock the device and may have assigned the same fingerprint to access certain other data on the device. The fingerprint information may be stored by a server that is accessed by the application executing thereon. Meanwhile, the intended recipient of the data (henceforth called user B) also records a fingerprint such as at the central serve or database (via their own device, or another device). This fingerprint may allow user B to unlock the device and access only the stored secure data on the device and nothing else. Therefore, User B is only able access the device to retrieve the secure data for project members via the device of user A who is not a member of the project.

Figure 9:
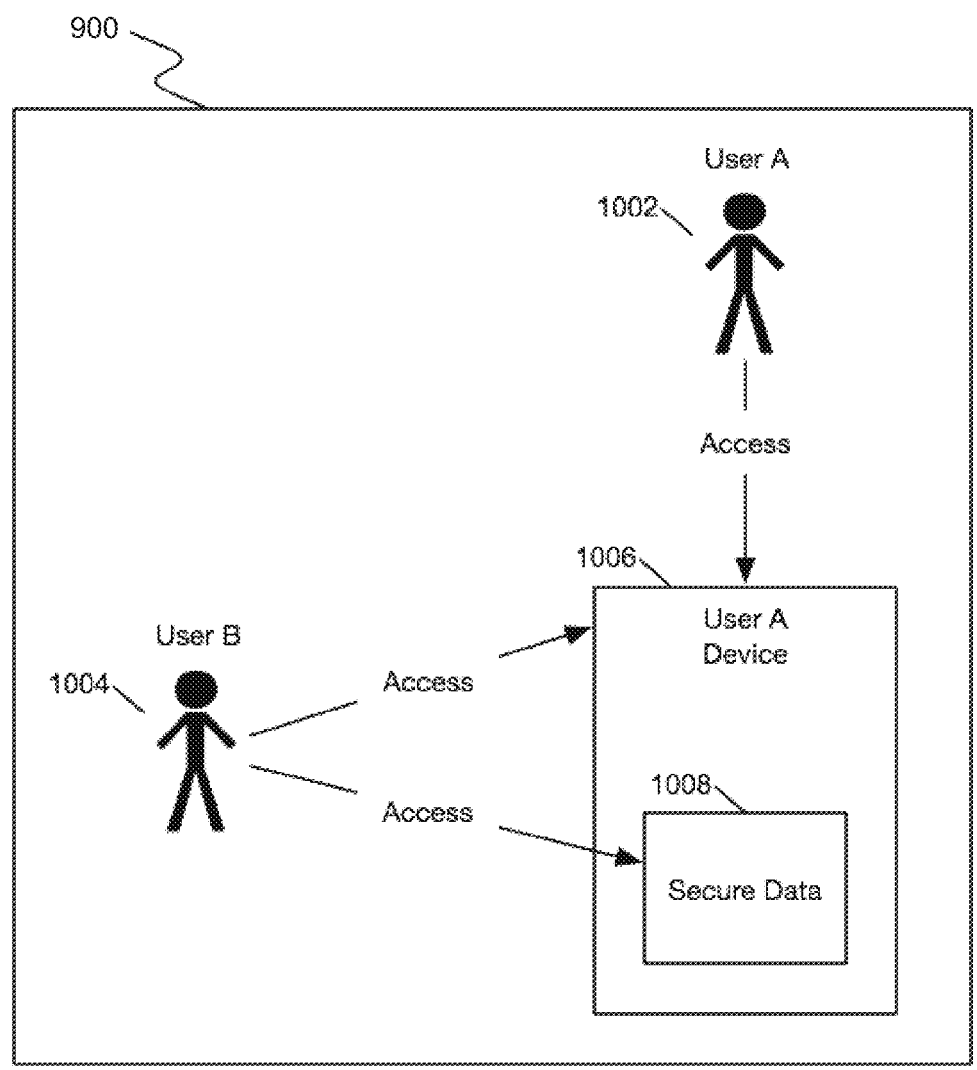
FIG. 9 is a diagram illustrating a process of secure content being accessed by a recipient through a device of an unintended recipient according to an embodiment.

FIG. 9 illustrates a process 900 of secure content being accessed by a recipient through a device of an unintended recipient according to an embodiment. In this example, two users of a device have access to different data on the device 1000. In this example, user A 1002, who is the owner of the device 1006, has access to the device 1006. This access may be through security functionality such as a numerical passcode, or fingerprint reader, for example. Meanwhile, user B 1004 who is not the owner of the device 1006 is also provided access to the device 1006, but only to access secure data 1008 stored on the device 1006 via the application executing thereon. In this example, user A 1002 is not provided access to the secure data.

For example, access to the device 1006 may be restricted such that user B 1004 must provide authentication via common authentication methods such as a numerical data entry or fingerprint technology, for example. As such, user B 1004 may provide fingerprint authentication for the device prior to accessing the secure data 1008. Here, the secure data may be pushed to the device 1006 from an external source, for example the data delivery server 1030 shown in FIG. 10. The secure data is stored either locally on the device 1006 or on a remote location of a network, such as an external database 110. If stored remotely, the user B 1004 may use device 1006 to access the data via messaging between the device 1006 and the remote database.

Figure 10:
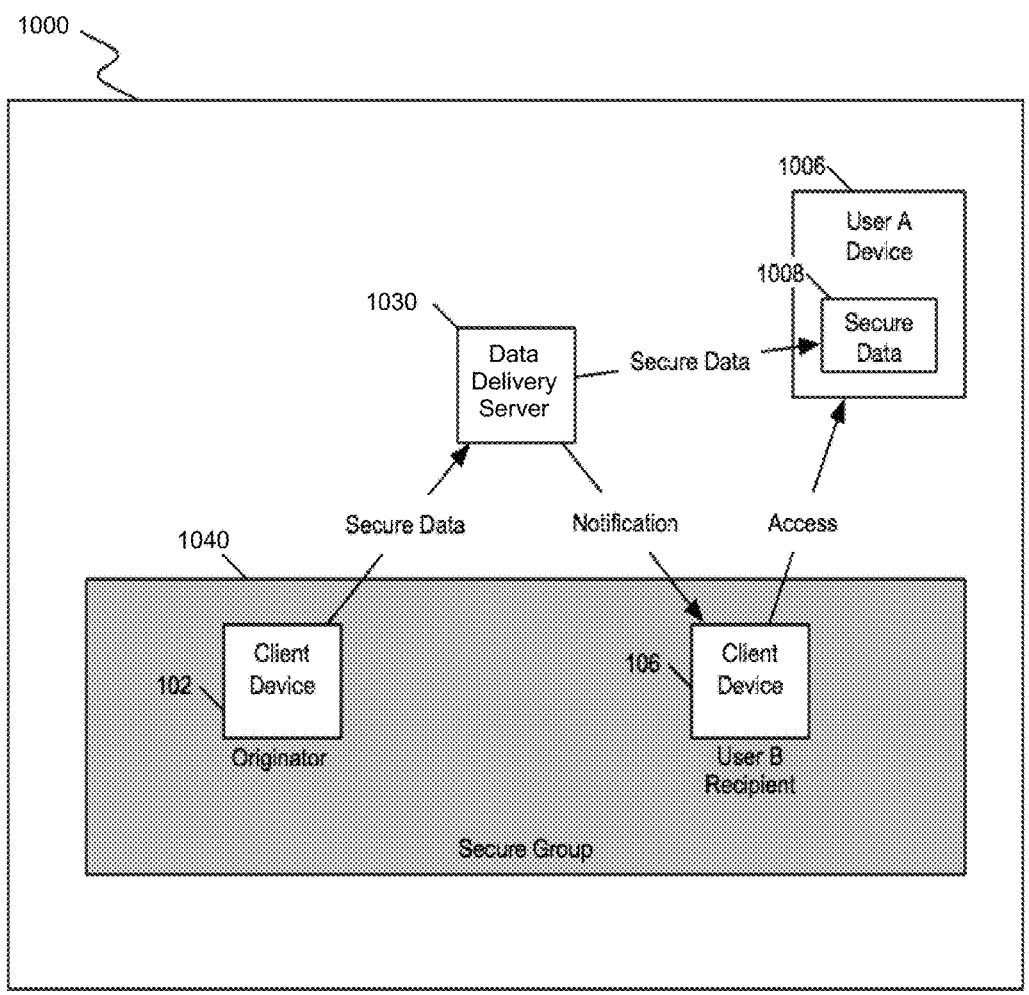
FIG. 10 is a diagram illustrating a process of transmitting secure content to an unintended recipient according to an embodiment.

FIG. 10 illustrates a process 1000 of transmitting secure content to an unintended recipient according to an embodiment. FIG. 10 illustrates an example of the delivery of secure data to a device outside of a group 1040. In this example, an originator 102 (i.e., sender) and a recipient 106 of a message are part of a secure group 1040. This group may be a subset of users within an organization, for example. The group may be defined through software of the organization, for example project management software. Secure data may be sent from the device of the originator 102 with the recipient 106 (User B) as the destination. The data may be included in a message, such as a chat, email or the like.

The message may be routed to a server such as data delivery server 1008. Upon receipt of the data, the data delivery server 1008 may determine that the originator 102 and the recipient 106 are in the secure group 1040 and in response send the secure data to a device 1006 of a user (User A) who is outside of the secure group 1040 but who is associated with a same organization as the secure group 1040. For example, a determination of the users who are inside the secure group and users who are outside of the group may be obtained via software of the organization, for example project management software wherein the current application interworks with the project management via functionality, for example Application Programming Interfaces (APIs).

The data is received by the device of user A 1006 (i.e. unintended recipient) who is not a member of the secure group 1040 and it may be stored locally 1008 on the device 1006. However, in other embodiments, the secure data is accessible via the software executing on user A device 1006, yet resides remotely such as at a remote server or database. The intended recipient of the secure data (user B) is notified of the remote storage of data via a message sent to the device 106 of user B. The notification informs user B that secure data resides on user A's device 1006. As a result, user B is then able to obtain the secure data by obtaining access to user A's device 1006 such that the secure data 1008 stored on the device 1006 of user A is only accessible to user B. Authentication via user A's device 1006 allows the access of user B to the device 1006 as well as access to the secure data.

Figure 11:
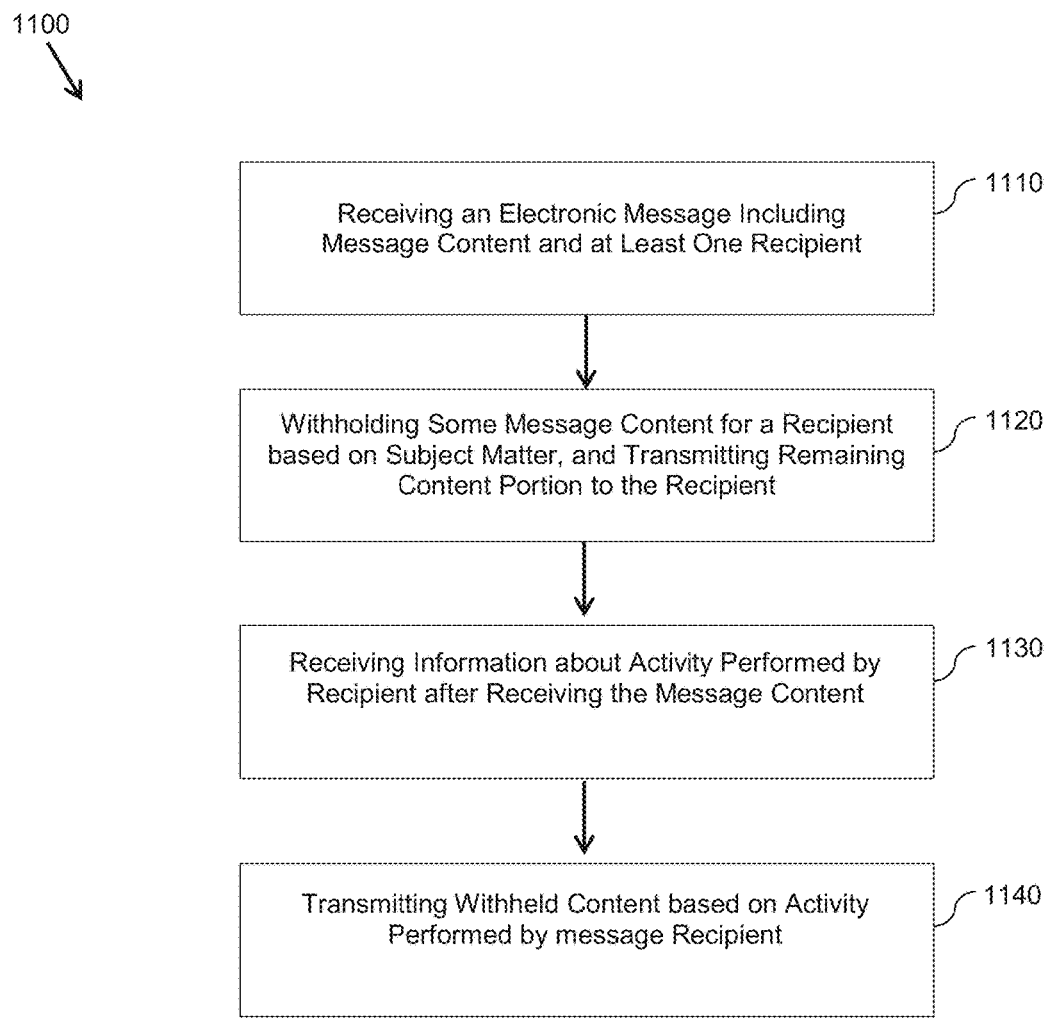
FIG. 11 is a diagram illustrating a method for withholding message content according to an embodiment.

FIG. 11 illustrates a method 1100 of withholding message content according to an embodiment. For example, the method 1100 may be performed by the application described herein executing on a withholding server 108 described with respect to FIG. 1, or another device or combination of devices. Referring to FIG. 11, in 1110, the method includes receiving an electronic message from a user device. For example, the electronic message may be an email, an instant message, a SMS message, or the like, and may include at least one message recipient.

In 1120, the method includes withholding a portion of the content of the electronic message for a message recipient based on a subject matter of the content portion and transmitting a remaining content portion of the electronic message to the message recipient. The withheld content may include non-generic details within textual content of the electronic message or within an attachment to the electronic message. For example, the withheld content may include at least one paragraph included in a body of the electronic message based on a subject matter extracted from textual content of the at least one paragraph, least one attached computer file that is attached to the electronic message based on a subject matter extracted from textual content included in the attached computer file, and the like. The withholding in 1120 may include parsing textual content included within a body of the electronic message, splitting the parsed content into content associated with secure subject matter and content associated with non-secure subject matter, and withholding the split textual content associated with secure subject matter. In some cases, the withholding may further include replacing the split textual content associated with secure subject matter with more generic textual content.

In 1130, the method includes receiving information about a subsequent activity of the message recipient from a message recipient device, and in 1140, the method includes transmitting withheld content to the message recipient based on the received information about the subsequent activity of the message recipient. For example, the subsequent activity information may include data viewed via a web browsing client of the message recipient device, a communication session between the message recipient device and another user device via at least one of an email client, a messaging client, and a voice service, and/or a combination of both data viewed and communication information. In 1130, the receiving may include receiving a message including textual data associated with the message recipient that is extracted from at least one of content viewed via a web browser of the message recipient device and a communication session between the message recipient device and another user device. In some embodiments, the method may further include identifying at least one keyword included within the textual data associated with the message recipient and comparing the identified at least one keyword to one or more keywords included within the withheld content. In this example, the transmitting may include transmitting a portion of the withheld content that has a keyword that matches a keyword included within the textual data associated with the message recipient.

Figure 12:
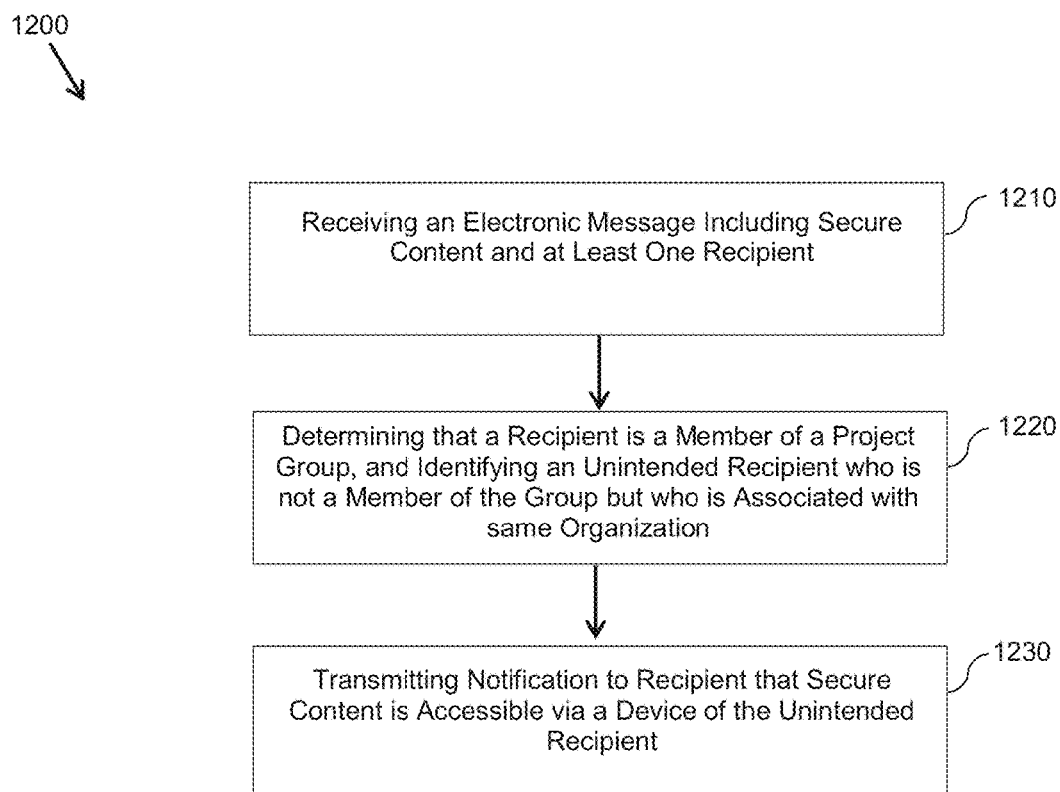
FIG. 12 is a diagram illustrating a method for modifying a recipient of an electronic message according to an embodiment.

FIG. 12 illustrates a method 1200 of delivering message content to an unintended recipient according to an embodiment. For example, the method 1200 may be performed by the application described herein deployed on the data delivery device 1008 of FIG. 10 or another device. Referring to FIG. 12, in 1210 the method includes receiving an electronic message from a user device, the electronic message including secure content and one or more recipients. The secure content may be content that is intended only for users or members of a particular project or a particular group, associated with an organization. For example, the project group may include a group of users within the organization that are participating in a work-related project, and the electronic message may include at least one of a document and a message body including secure textual content intended for members of the work-related project.

In 1220, the method includes determining that a recipient of the electronic message is a member of a project group associated with an organization, and in response, identifying an unintended recipient who is not a member of the project group but that is associated with the organization. For example, the project information may be extracted from an application programming interface (API) of project manager software of the organization, and the determining that the recipient is a member of the project group may be determined based on the extracted project information. The unintended recipient may also be identified from the extracted project information. For example, the application may extract a list of users who are associated with the organization but that are not members of the group and select a user from the list as the unintended recipient (e.g., a user who is geographically closest to the intended recipient, etc.).

In response, the method further includes transmitting a notification to a device of the recipient indicating that access to the secure content is accessible via a device of the unintended recipient instead of transmitting the secure content directly to the device of the recipient, in 1230. The transmitting in 1230 may also include transmitting a notification to the device of the unintended recipient indicating that the secure content is accessible via that device of the unintended recipient. The secure content may be delivered directly to the device of the unintended recipient and accessed only by the intended recipient using secure authentication (e.g., biometrics, retinal scan, fingerprint, username, password, and the like). As another example, the secure content may be stored at a remote location and accessed by the authenticated intended recipient using the device of the unintended recipient. Accordingly, rather than transmit secure content directly to a device of a group project member, the method may provide access to the secure content via a device of an unintended recipient of the secure content. Here, the recipient may use the device of the unintended recipient to securely login to the application and recite the secure content without the secure content being exposed to the unintended recipient.

Figure 13:
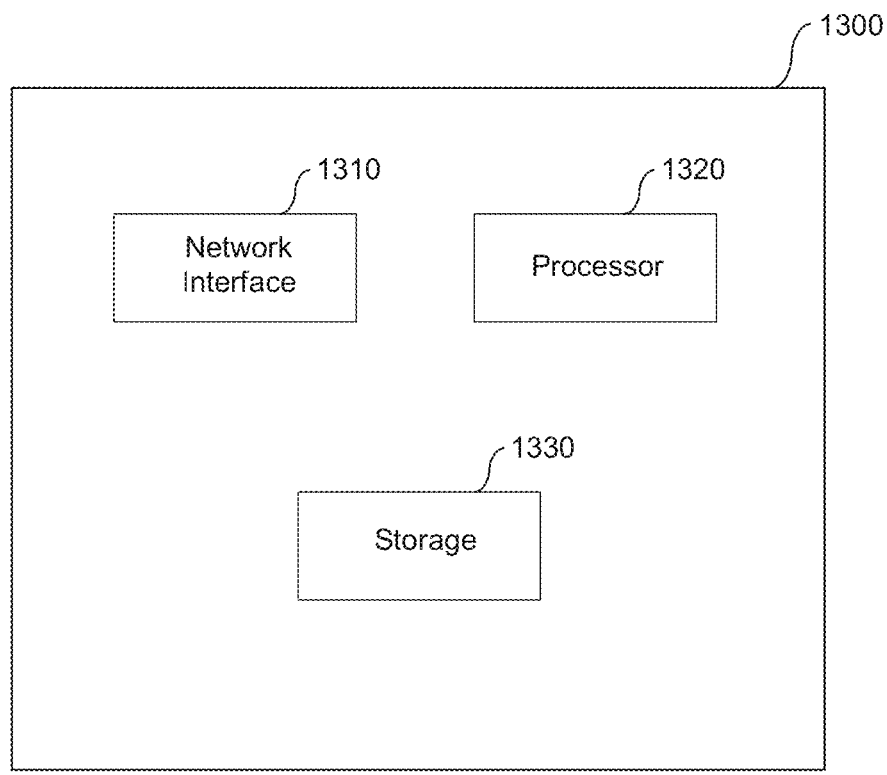
FIG. 13 is a diagram illustrating a computing device for modifying message content according to an embodiment.

FIG. 13 illustrates a computing device 1300 for modifying message content according to an embodiment. The computing device 1300 may perform the method 1100 of FIG. 11 and/or the method 1200 of FIG. 12. Here, the computing device 1300 may correspond to the withholding server 108 of FIG. 8, the data delivery server 1030 of FIG. 10, or another device. The computing device 1300 may be a server, a cloud computing system, a user device such as a computer, a tablet, a smart phone, an appliance, and the like. In the example of FIG. 13, the computing device 1300 includes a network interface 1310, a processor 1320, and storage 1330. It should also be understood that the computing system 1300 may include other components such as an output device, one or more input units, a display (embedded or connected externally), and the like.

In operation, the network interface 1310 may receive an electronic message including digital message content such as digital text, images, photos, attached files, and the like, and at least one message recipient that may be included with a TO: field of the message. According to various embodiments, the processor 1320 may withhold a portion of the content of the electronic message for a message recipient based on the subject matter of the content portion, and control the network interface 1310 to transmit the remaining content portion of the electronic message to the message recipient. For example, the processor 1320 may withhold one or more paragraphs of text, one or more sentences of text, one or more words of text, etc. from within a body of the electronic message. As another example, the processor 1320 may withhold an attached computer file such as a word document, a .PDF, a photo, and the like.

The processor 1320 may receive information about a subsequent activity of the message recipient from a message recipient device, via the network interface 1310, and control the network interface 1310 to transmit withheld content to the message recipient based on the received information about the subsequent activity of the message recipient. For example, the processor may transmit the withheld content in steps, and not all at once, based on a subject matter of the identified subsequent activity of the message recipient. The subsequent activity may include content that is viewed by the recipient via a web browser of the recipient device, a transcript of a communication session (e.g., chat, instant message, text message, email, voice, etc.) between the recipient and another user, and the like.

According to various additional embodiments, the network interface 1310 may receive an electronic message including secure content intended for one or more recipients within a group project associated with an organization. In this example, the processor 1320 may determine that a recipient of the electronic message is a member of the project group associated with the organization based on project information obtained from a project management software application associated with the organization. The processor 1320 may also identify an unintended recipient who is not a member of the project group but that is associated with the organization based on the project management software application. In this example, the processor 1320 may control the network interface 1310 to transmit a notification to a device of the recipient indicating that access to the secure content is accessible via a device of the unintended recipient instead of transmitting the secure content directly to the device of the recipient. In various examples, the storage 1330 may store information about recipients, subject matter associated with recipients, sender information, project information, group information, and the like.

The example embodiments are directed to electronic messages in general, such as email, group text message, text message, SMS messages, or any other type of digital message data being sent. The message may be sent to one or more recipients and the message may contain textual and image content within as well as one or more attachments which may include text and images, an appended media file such as a photography file, and the like. Furthermore, the photo could include sensitive data such as financial, personal information, and the like.

The above-described examples of the disclosure may be implemented using computer programming or engineering techniques including computer software, firmware, hardware or any combination or subset thereof. Any such resulting program, having computer-readable code, may be embodied or provided within one or more computer-readable media, thereby making a computer program product, i.e., an article of manufacture, according to the discussed examples of the disclosure. For example, the computer-readable media may be, but is not limited to, a fixed drive, diskette, optical disk, magnetic tape, flash memory, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

An exemplary storage medium may be coupled to the processor such that the processor may read information from, and write information to, the storage medium. In the alternative, the storage medium may be integral to the processor. The processor and the storage medium may reside in an application specific integrated circuit (ASIC). In the alternative, the processor and the storage medium may reside as discrete components, for example a network element, which may represent network components.

Although an exemplary example of the system, method, and computer readable medium of the present disclosure has been illustrated in the accompanied drawings and described in the foregoing detailed description, it may be understood that the disclosure is not limited to the examples disclosed, and is capable of numerous rearrangements, modifications, and substitutions without departing from the spirit or scope of the disclosure as set forth and defined by the following claims. For example, the capabilities of the systems may be performed by one or more of the modules or components described herein or in a distributed architecture. For example, the functionality performed by the individual modules, may be performed by one or more of these modules. Further, the functionality described herein may be performed at various times and in relation to various events, internal or external to the modules or components. Also, the information sent between various modules may be sent between the modules via at least one of: a data network, the Internet, a voice network, an Internet Protocol network, a wireless device, a wired device and/or via plurality of protocols. Also, the messages sent or received by module and may be sent or received directly and/or via one or more of the other modules.

While preferred examples of the present application have been described, it is to be understood that the examples described are illustrative only and the scope of the application is to be defined solely by the appended claims when considered with a full range of equivalents and modifications (e.g., protocols, hardware devices, software platforms etc.) thereto.

The invention claimed is:

1. A method comprising:
receiving an electronic message from a user device, the electronic message comprising secure content and one or more recipients;
determining that a recipient of the electronic message is a member of a project group associated with an organization, and in response, identifying an unintended recipient who is associated with the organization but who is not a member of the project group; and
transmitting a notification to a device of the recipient indicating that the secure content is accessible via a device of the unintended recipient instead of transmitting the secure content directly to the device of the recipient;
wherein the transmitting comprises transmitting a notification indicating that the secure content is stored at a remote network location and is accessible to the recipient via secure login through the device of the unintended recipient;
wherein the secure content is provided to the recipient via the device of the unintended recipient in response to a biometric security identification of the recipient via the device of the unintended recipient.

2. The method of claim 1, wherein the project group comprises a group of users within the organization that are participating in a work-related project, and the electronic message comprises at least one of a document and a message body including secure textual content intended for members of the work-related project.

3. The method of claim 1, wherein the transmitting comprises transmitting the secure content with the notification and enabling the secure content to be stored locally on the device of the unintended recipient and accessed locally through secure login by the recipient.

4. The method of claim 1, wherein the method further comprises extracting project information from an application programming interface (API) of project manager software that is associated with the organization, and the determining that the recipient is a member of the project group is determined based on the extracted project information.

5. The method of claim 1, wherein the unintended recipient is selected from a group of possible unintended recipients based on a geographical location of the device of the unintended recipient with respect to the device of the message recipient.

6. The method of claim 1, wherein the method further comprises transmitting a notification to the device of the unintended recipient indicating that the secure content is accessible via the device of the unintended recipient.

7. A computing system comprising:
a network interface configured to receive an electronic message from a user device, the electronic message comprising secure content and one or more recipients; and
a processor configured to determine that a recipient of the electronic message is a member of a project group associated with an organization, and in response, identify an unintended recipient who is associated with the organization but who is not a member of the project group, wherein
the processor is further configured to control the network interface to transmit a notification to a device of the recipient indicating that access to the secure content is accessible via a device of the unintended recipient instead of a transmission of the secure content directly to the device of the recipient;
wherein the transmission comprises transmission of a notification that indicates the secure content is stored at a remote network location and is accessible to the recipient via secure login through the device of the unintended recipient;
wherein the secure content is provided to the recipient via the device of the unintended recipient in response to a biometric security identification of the recipient via the device of the unintended recipient.

8. The computing system of claim 7, wherein the project group comprises a group of users within the organization that are participating in a work-related project, and the electronic message comprises at least one of a document and a message body including secure textual content intended for members of the work-related project.

9. The computing system of claim 7, wherein the processor controls the network interface to further transmit the secure content along with the notification and enable the secure content to be stored locally on the device of the unintended recipient and accessed locally through secure login by the recipient.

10. The computing system of claim 7, wherein the processor is further configured to extract project information from an application programming interface (API) of a project manager software associated with the organization, and determine that the recipient is a member of the project group based on the extracted project information.

11. The computing system of claim 7, wherein the processor selects the unintended recipient from a group of possible unintended recipients based on a geographical location of the device of the unintended recipient with respect to the device of the message recipient.

12. The computing system of claim 7, wherein the processor is further configured to control the network interface to transmit a notification to the device of the unintended recipient indicating that the secure content is accessible via the device of the unintended recipient.

13. A non-transitory computer readable medium storing instructions that when executed by a processor causes the processor to perform a method comprising:
receiving an electronic message from a user device, the electronic message comprising secure content and one or more recipients;
determining that a recipient of the electronic message is a member of a project group associated with an organization, and in response, identifying an unintended recipient who is not a member of the project group and is associated with the organization; and
transmitting a notification to a device of the recipient indicating that access to the secure content is accessible via a device of the unintended recipient instead of transmitting the secure content directly to the device of the recipient;
wherein the transmitting comprises transmitting a notification indicating that the secure content is stored at a remote network location and is accessible to the recipient via secure login through the device of the unintended recipient;
wherein the secure content is provided to the recipient via the device of the unintended recipient in response to a biometric security identification of the recipient via the device of the unintended recipient.

14. The non-transitory computer readable medium of claim 13, wherein the project group comprises a group of users within the organization that are participating in a work-related project, and the electronic message comprises at least one of a document and a message body including secure textual content intended for members of the work-related project.

15. The non-transitory computer readable medium of claim 13, wherein the transmitting comprises transmitting the secure content with the notification and enabling the secure content to be stored locally on the device of the unintended recipient and accessed locally through secure login by the recipient.

\* \* \* \* \*